(12) United States Patent
Wang et al.

(10) Patent No.: US 9,165,067 B2
(45) Date of Patent: Oct. 20, 2015

(54) COMPUTER SYSTEM, AUDIO MATCHING METHOD, AND NON-TRANSITORY COMPUTER-READABLE RECORDING MEDIUM THEREOF

(71) Applicant: INSTITUTE FOR INFORMATION INDUSTRY, Taipei (TW)

(72) Inventors: Chung-Che Wang, Yulin County (TW); Yao-Min Huang, Taipei (TW); Pei-Yu Liao, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 101 days.

(21) Appl. No.: 14/174,857

(22) Filed: Feb. 7, 2014

(65) Prior Publication Data

US 2015/0131804 A1      May 14, 2015

(30) Foreign Application Priority Data

Nov. 11, 2013 (TW) ............................. 102140915 A

(51) Int. Cl.
*G06F 17/30* (2006.01)
(52) U.S. Cl.
CPC .................................. *G06F 17/3074* (2013.01)
(58) Field of Classification Search
CPC ...... H04R 29/00; H04R 3/005; H04R 29/008; H04R 29/004; H04R 2499/11; H04R 3/00; H04R 3/04
USPC ........................................................... 381/56
See application file for complete search history.

(56) References Cited

U.S. PATENT DOCUMENTS

| 7,627,477 B2 * | 12/2009 | Wang et al. .................... 704/273 |
| 8,266,142 B2 | 9/2012 | Jiang et al. |
| 2014/0254807 A1 * | 9/2014 | Fonseca et al. ................. 381/56 |

OTHER PUBLICATIONS

Avery Li-Chun Wang, An Industrial-Strength Audio Search Algorithm.

* cited by examiner

*Primary Examiner* — Mark Blouin
(74) *Attorney, Agent, or Firm* — CKC & Partners Co., Ltd.

(57) ABSTRACT

A computer system is configured for performing audio matching. The computer system includes a client terminal and a server. The client terminal includes a classifier, a first landmark extraction module, a first encoder module and an integration module. The classifier is configured for estimating an identification difficulty. The first landmark extraction module is configured for determining the number of times for landmark extraction, and for extracting first landmarks. The first encoder module is configured for encoding the first landmarks. The server includes a second landmark extraction module, a second encoder module, a hash table, a table-lookup module, an analysis module and a decision module. The second landmark extraction module is configured for extracting second landmarks. The second encoder module is configured for encoding the second landmarks. The table-lookup module is configured for performing a table lookup. The decision module is configured for determining an audio matching result.

19 Claims, 5 Drawing Sheets

COMPUTER SYSTEM, AUDIO MATCHING METHOD, AND NON-TRANSITORY COMPUTER-READABLE RECORDING MEDIUM THEREOF

RELATED APPLICATIONS

This application claims priority to Taiwan Application Serial Number 102140915, filed Nov. 11, 2013, the entirety of which is herein incorporated by reference.

BACKGROUND

1. Technical Field

The present disclosure relates to a computer system and an audio matching method. More particularly, the present disclosure relates to a computer system configured for performing audio matching.

2. Description of Related Art

Audio matching is a fast audio searching method, a user could record an audio segment being played in a noisy environment, and search for a song, a movie, a TV program or a broadcast program which best matches the audio segment by utilizing an audio matching system.

However, the accuracy of audio matching, the waiting time required for audio matching and the computation load of the audio matching server of current audio matching systems are not satisfactory.

SUMMARY

In one aspect, the present disclosure is related to a computer system configured for performing audio matching. The computer system includes a client terminal and a server. The client terminal includes a classifier, a first landmark extraction module, a first encoder module and an integration module. The classifier is configured for estimating an identification difficulty of a first audio segment of a first audio sample. The first landmark extraction module is configured for determining the number of times for landmark extraction according to the identification difficulty, and for extracting landmarks from the first audio segment accordingly to generate a plurality of first landmarks. The first encoder module is configured for encoding the first landmarks into a plurality of first hash keys. The integration module is configured for integrating the first hash keys and for generating and transmitting a plurality of integrated hash keys to the server. The server includes a second landmark extraction module, a second encoder module, a hash table, a table-lookup module, an analysis module and a decision module. The second landmark extraction module is configured for extracting landmarks from a plurality of second audio samples respectively to generate a plurality of second landmarks. The second encoder module is configured for encoding the second landmarks into a plurality of second hash keys. The hash table is configured for storing the second hash keys and a plurality of hash values corresponding to the second hash keys. The table-lookup module is configured for performing a table lookup between the hash keys transmitted from the client terminal and the second hash keys stored in the hash table. The analysis module is configured for analyzing results of the table lookup. The decision module is configured for determining an audio matching result and for transmitting the audio matching result to the client terminal.

In another aspect, the present disclosure is related to an audio matching method. The audio matching method includes the following steps: estimating an identification difficulty of a first audio segment of an audio sample; determining the number of times for landmark extraction according to the identification difficulty and extracting landmarks from the first audio segment accordingly to generate a plurality of landmarks; encoding the landmarks into a plurality of first hash keys; integrating the first hash keys and performing a table lookup between a plurality of integrated hash keys and a plurality of second hash keys stored in a hash table; analyzing results of the table lookup; and determining an audio matching result.

According to another embodiment of this disclosure, a non-transitory computer-readable storage medium storing a computer program for executing the steps of the aforementioned audio matching method is provided. Steps of the method are as disclosed above.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
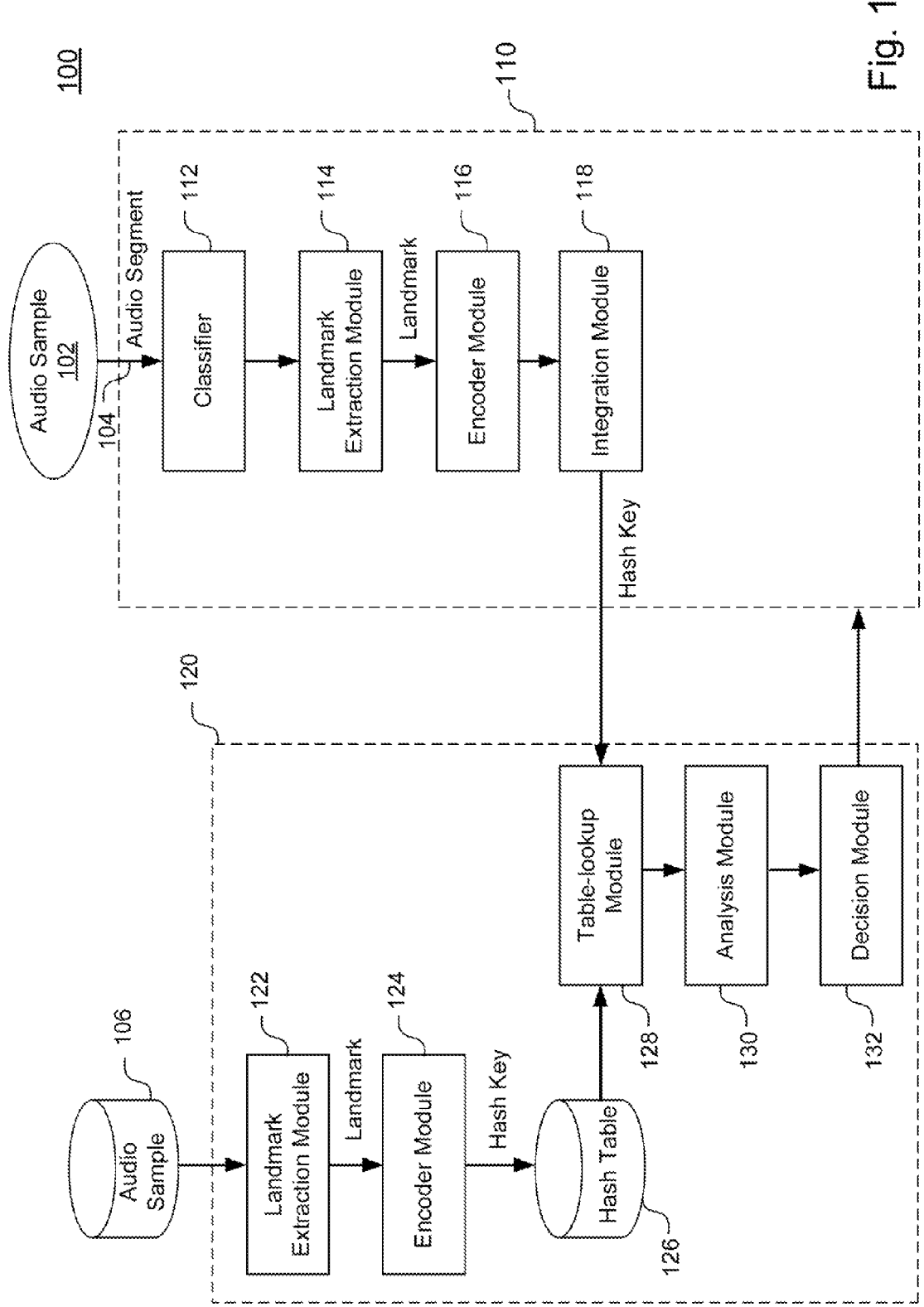
FIG. 1 is a schematic diagram of a computer system in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Please refer to FIG. 1. FIG. 1 is a schematic diagram of a computer system 100 in accordance with one embodiment of the present disclosure.

The computer system 100 is configured for comparing an audio sample 102 and a plurality of audio samples 106, and for determining whether the audio sample 102 matches one of the audio samples 106. In one embodiment of the present disclosure, the audio sample 102 is an audio segment of a song, a movie, a TV program or a broadcast program recorded by a smart phone, a tablet computer or a digital walkman. In another embodiment of the present disclosure, the audio sample 102 is an audio segment of a movie or a TV program recorded by a smart television or a digital television set-top-box.

The computer system 100 includes a client terminal 110 and a server 120. In one embodiment of the present disclosure, the client terminal 110 can be a handheld device, for example: a smart phone, a tablet computer, a digital walkman, a smart watch or a smart glasses. In another embodiment of the present disclosure, the client terminal 110 can be a smart television, a digital television set-top-box or a laptop.

It has to be explained that the audio sample 102 can be generated by the client terminal 110. In an example, the audio sample 102 is a music segment recorded by a smart phone with one minute length.

The client terminal 110 includes a classifier 112, a landmark extraction module 114, an encoder module 116 and an integration module 118. The classifier 112 is configured for estimating an identification difficulty of an audio segment 104 of the audio sample 102, and for classifying the audio segment 104 according to the identification difficulty. In an example, the audio sample 102 is an audio segment of a TV program with one minute length, and the classifier 112 is configured for estimating an identification difficulty of an audio segment 104 with ten seconds length of the abovementioned audio segment of the TV program. In an embodiment of the present disclosure, the classifier 112 estimates the identification difficulty according to one or a combination of the following three statistic parameters: the average value of the absolute volume of the audio segment 104, the standard deviation of the relative volume of the audio segment 104, the standard deviation of the sum of the absolute value of the third order differentiation of the audio segment 104. The classifier classifies the audio segment 104 as an easily-identifying audio segment or a hardly-identifying audio segment according to the identification difficulty. It has to be explained that the number of statistic parameters which could be utilized to estimate the identification difficulty are not limited to three, and the statistic parameters which could be utilized to estimate the identification difficulty are not limited to the abovementioned ones. The statistic parameters illustrated in Table 1 could be utilized to estimate the identification difficulty, but are not limited thereto.

TABLE 1

| | |
|---|---|
| Maximum value of the absolute volume | Maximum value of the time difference of the landmarks |
| Minimum value of the absolute volume | Minimum value of the time difference of the landmarks |
| Average value of the absolute volume | Average value of the time difference of the landmarks |
| Standard deviation of the absolute volume | Standard deviation of the time difference of the landmarks |
| Maximum value of the relative volume | Maximum value of the sum of frequency difference and time difference of the landmarks |
| Minimum value of the relative relativevolume | Minimum value of the sum of frequency difference and time difference of the landmarks |
| Average value of the relative volume | Average value of the sum of frequency difference and time difference of the landmarks |
| Standard deviation of the relative volume | Standard deviation of the sum of frequency difference and time difference of the landmarks |
| Maximum value of the sum of the absolute value of a multiple order differentiation of the waveform | Maximum value of the distance of the landmarks at frequency spectrum |
| Minimum value of the sum of the absolute value of a multiple order differentiation of the waveform | Minimum value of the distance of the landmarks at frequency spectrum |
| Average value of the sum of the absolute value of a multiple order differentiation of the waveform | Average value of the distance of the landmarks at frequency spectrum |
| Standard deviation of the sum of the absolute value of a multiple order differentiation of the waveform | Standard deviation of the distance of the landmarks at frequency spectrum |
| Maximum value of the starting frequency of the landmarks | Maximum value of the starting energy of the landmarks |
| Minimum value of the starting frequency of the landmarks | Minimum value of the starting energy of the landmarks |
| Average value of the starting frequency of the landmarks | Average value of the starting energy of the landmarks |
| Standard deviation of the starting frequency of the landmarks | Standard deviation of the starting energy of the landmarks |
| Maximum value of the ending frequency of the landmarks | Maximum value of the ending energy of the landmarks |
| Minimum value of the ending frequency of the landmarks | Minimum value of the ending energy of the landmarks |
| Average value of the ending frequency of the landmarks | Average value of the ending energy of the landmarks |
| Standard deviation of the ending frequency of the landmarks | Standard deviation of the ending energy of the landmarks |
| Maximum value of the frequency difference of the landmarks | Number of the landmarks |
| Minimum value of the frequency difference of the landmarks | |
| Average value of the frequency difference of the landmarks | |
| Standard deviation of the frequency difference of the landmarks | |

In another embodiment of the present disclosure, the classifier 112 estimates the identification difficulty of the audio segment 104 according to the following four statistic parameters: the standard deviation of the absolute volume, the average value of the starting frequency of the landmarks, the standard deviation of the frequency difference between the landmarks, and the maximum value of the time difference between the landmarks. In the present disclosure, a landmark could consist of the starting frequency, the frequency difference and the time difference of two adjacent peaks on the time-frequency spectrum of sampled audio frames of the audio segment 104.

The landmark extraction module 114 is configured for determining the number of times for landmark extraction according to the abovementioned identification difficulty, for extracting landmarks from the audio segment 104 accordingly to generate a plurality of landmarks, and for transmitting the landmarks to the encoder module 116. In the following paragraph, we will specifically explain how the landmark extraction module extracts landmarks from the audio segment in accordance with one embodiment of the present disclosure.

Figure 2:
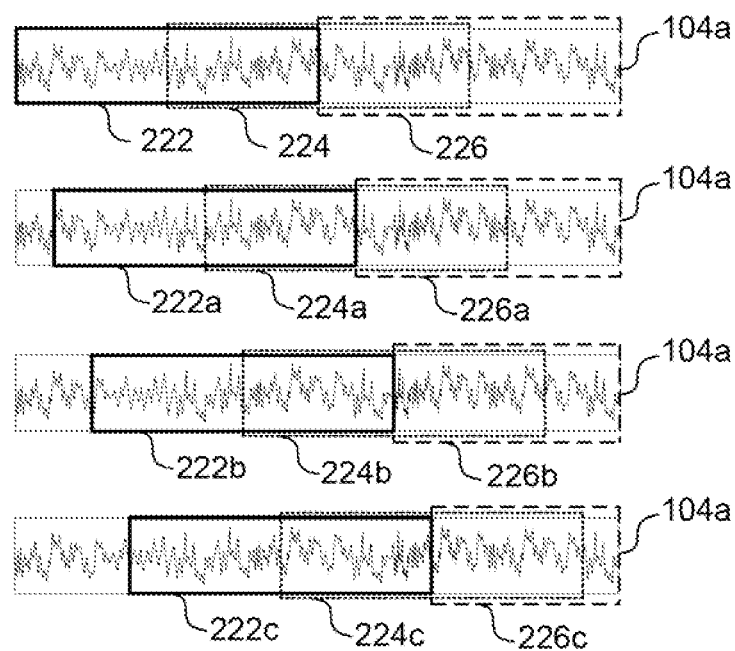
FIG. 2 is a schematic diagram of how the landmark extraction module extracts landmarks from the audio segment in accordance with one embodiment of the present disclosure.

Please refer to FIG. 2. FIG. 2 is a schematic diagram of how the landmark extraction module extracts landmarks from the audio segment in accordance with one embodiment of the present disclosure. As illustrated in FIG. 2, if an audio segment 104a is classified as an easily-identifying audio segment by the classifier 112, the landmark extraction module 114 performs four times of landmark extraction on the audio segment 104a. The first time of landmark extraction is performed by extracting the landmarks of partially overlapping audio frames 222, 224 and 226 of the audio segment 104a, in which the landmark could consist of the starting frequency, the frequency difference and the time difference of two adjacent peaks on the time-frequency spectrum of the sampled audio frame. The second time of landmark extraction is performed by extracting the landmarks of partially overlapping audio frames 222a, 224a and 226a of the audio segment 104a, in which the audio frames 222a, 224a and 226a are time shifts of the audio frames 222, 224 and 226. The third time of landmark extraction is performed by extracting the landmarks of partially overlapping audio frames 222b, 224b and 226b of the audio segment 104a, in which the audio frames 222b, 224b and 226b are time shifts of the audio frames 222a, 224a and 226a. The fourth time of landmark extraction is as illustrated in FIG. 2, which is similar to the abovementioned operations and is not described again herein.

Figure 3:
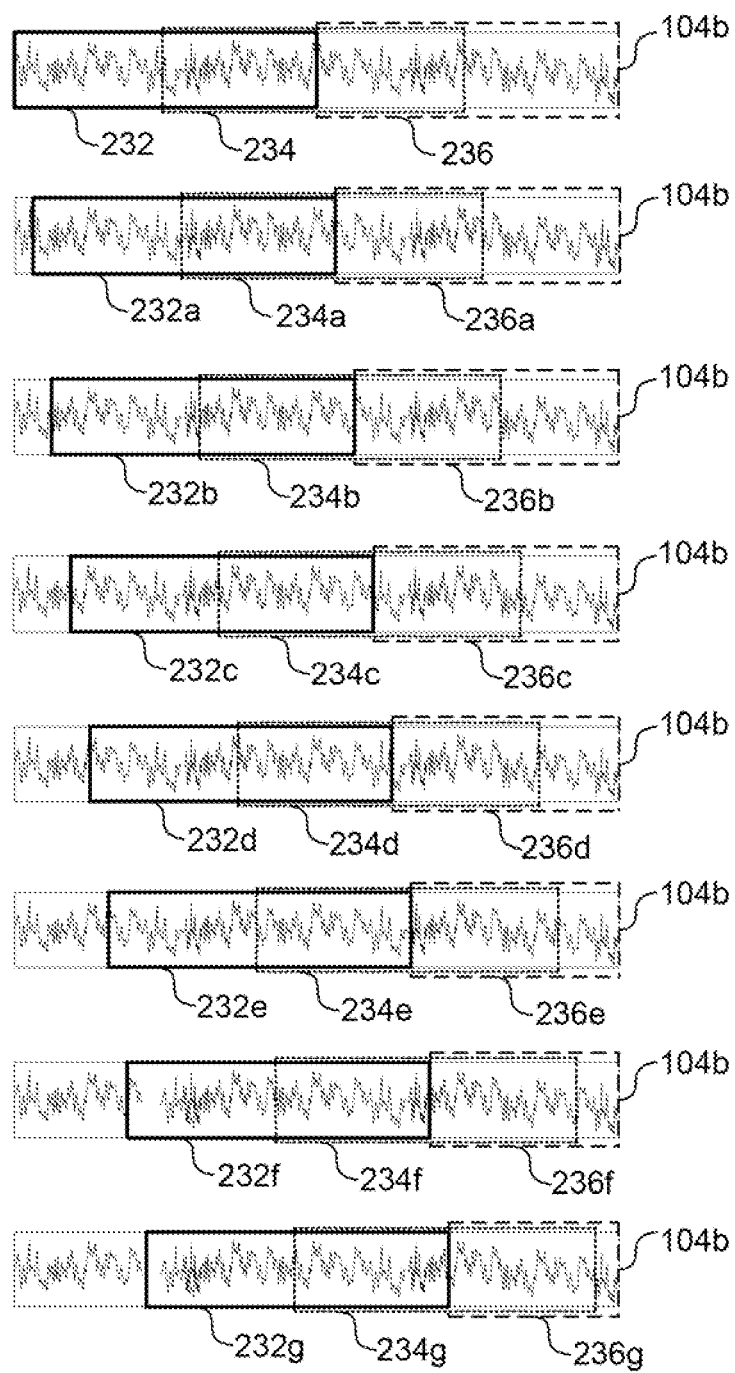
FIG. 3 is a schematic diagram of how the landmark extraction module extracts landmarks from the audio segment in accordance with one embodiment of the present disclosure.

Please refer to FIG. 3. FIG. 3 is a schematic diagram of how the landmark extraction module extracts landmarks from the audio segment in accordance with one embodiment of the present disclosure. As illustrated in FIG. 3, if an audio segment 104b is classified as a hardly-identifying audio segment by the classifier 112, the landmark extraction module 114 performs eight times of landmark extraction on the audio segment 104b. The first time of landmark extraction is performed by extracting the landmarks of partially overlapping audio frames 232, 234 and 236 of the audio segment 104b, in which the landmark could consist of the starting frequency, the frequency difference and the time difference of two adjacent peaks on the time-frequency spectrum of the sampled audio frame. The second time of landmark extraction is performed by extracting the landmarks of partially overlapping audio frames 232a, 234a and 236a of the audio segment 104b, in which the audio frames 232a, 234a and 236a are time shifts of the audio frames 232, 234 and 236. The third time of landmark extraction is performed by extracting the landmarks of partially overlapping audio frames 232b, 234b and 236b of the audio segment 104a, in which the audio frames 232b, 234b and 236b are time shifts of the audio frames 232a, 234a and 236a. The fourth to eighth time of landmark extractions are as illustrated in FIG. 3, which are similar to the abovementioned operations and are not described again herein.

It has to be explained that the number of times for landmark extraction is not limited to four or eight. In another embodiment of the present disclosure, if an audio segment 104 is classified as an easily-identifying audio segment by the classifier 112, the landmark extraction module 114 performs five times of landmark extraction on the audio segment 104; and if an audio segment 104 is classified as a hardly-identifying audio segment by the classifier 112, the landmark extraction module 114 performs ten times of landmark extraction on the audio segment 104.

The encoder module 116 is configured for encoding the landmarks into corresponding hash keys and for transmitting the hash keys to the integration module 118. In an embodiment of the present disclosure, the landmarks consist of the starting frequency, the frequency difference and the time difference of two adjacent peaks on the time-frequency spectrum of the sampled audio frame. The encoder module 116 is configured for encoding the landmarks into corresponding 24-bits hash keys, in which 9 bits of the hash keys are configured for describing the starting frequency, 8 bits of the hash keys are configured for describing the frequency difference, and 7 bits of the hash keys are configured for describing the time difference. It has to be explained that the length of the hash keys is not limited to 24 bits. In another embodiment of the present disclosure, the length of the hash keys is 26 bits.

The integration module 118 is configured for integrating the hash keys and for generating and transmitting a plurality of integrated hash keys to the server 120. In an embodiment of the present disclosure, when two hash keys generated by the encoder module 116 are equal to each other, the integration module 118 is configured for deleting one of the two hash keys, and for transmitting the remaining distinct hash keys to the server 120.

The server 120 includes a landmark extraction module 122, an encoder module 124, a hash table 126, a table-lookup module 128, an analysis module 130 and a decision module 132.

The landmark extraction module 122 is configured for extracting landmarks from a plurality of audio samples 106 respectively to generate a plurality of landmarks, and for transmitting the landmarks to the encoder module 124. The encoder module 124 is configured for encoding the landmarks into a plurality of hash keys. The hash table 126 is configured for storing the hash keys and a plurality of hash values corresponding to the hash keys.

In an embodiment of the present disclosure, the landmark extraction module 122 is configured for extracting landmarks from the audio samples 106, in which the landmarks consist of the starting frequency, the frequency difference and the time difference of two adjacent peaks on the time-frequency spectrum of the sampled audio frame. The encoder module 124 is configured for encoding the landmarks into corresponding 24-bits hash keys, in which 9 bits of the hash keys are configured for describing the starting frequency, 8 bits of the hash keys are configured for describing the frequency difference, and 7 bits of the hash keys are configured for describing the time difference.

The hash value of each of the hash keys could include the data of a landmark and of the audio sample corresponding to the landmark. In an embodiment of the present disclosure, the audio sample 106 includes the audio segments of several TV programs, and the hash value corresponding to each hash key on the hash table 126 includes a landmark starting time and a TV program data. For example, the TV program data could be a serial number of programs.

The table-lookup module 128 is configured for performing a table lookup between the hash keys transmitted from the client terminal 110 and the hash keys stored in the hash table 126. In an embodiment of the present disclosure, the table-lookup module 128 compares the hash keys transmitted from the client terminal 110 with all of the hash keys stored in the hash table 126 and transmits the matched hash keys (two hash keys are identical) to the analysis module 130.

The analysis module 130 is configured for analyzing results of the table lookup. The decision module 132 is configured for determining an audio matching result and for transmitting the audio matching result to the client terminal 110.

In one embodiment of the present disclosure, the audio samples 106 include the audio segments of several TV programs. The analysis module 130 transmits the matched hash keys and their corresponding hash values (the hash values include landmark starting time and serial numbers of TV programs) to the decision module 132. The decision module 132 counts the serial numbers of TV programs of those hash values, and determines the audio matching result as the TV program whose serial number has the most times of occurrence. The decision module 132 then transmits the audio matching result to the client terminal 110.

In another embodiment of the present disclosure, the analysis module 130 transmits the matched hash keys and their corresponding hash values (the hash values include landmark starting time and serial numbers of TV programs) to the decision module 132. The decision module 132 counts the serial numbers of TV programs of those hash values and estimates a degree of confidence, in which the degree of confidence is the average number of hash keys of the audio segment 104 matched in one second.

In one embodiment of the present disclosure, when the degree of confidence reaches a threshold value, the decision module 132 determines the audio matching result as the TV program whose serial number has the most times of occurrence. The decision module 132 then transmits the audio matching result to the client terminal 110. On the other hand, when the degree of confidence does not reach the threshold value, the decision module 132 sends a request to the client terminal 110. Upon receiving the request, the client terminal 110 inputs an audio segment (not depicted) of the audio sample 102 to the classifier 112, in which the audio segment succeeds to the audio segment 104. The computer system 100 then performs the abovementioned audio matching on the inputted audio segment. It has to be explained that the abovementioned threshold value could be 3, 4, or any other number which could be chosen by skilled persons.

From the abovementioned embodiments, the deviation between the sampled audio frames of the audio segment 104 and of the audio sample 106 could be reduced by shifting the sampled audio frames of the audio segment 104 according to its audio characteristics and extracting the landmarks accordingly. As a result, the accuracy of audio matching is improved due to the reduction of the deviation between the sampled audio frames of the audio segment 104 and of the audio sample 106. Moreover, the client terminal 110 could upload the data of audio segments sequentially to the server 120 for identification, and the server 120 transmits the audio matching result back to the client terminal 110 right after the degree of confidence reaches a threshold value. In this way, the waiting time required for audio matching and the computation load of the server 120 could be reduced.

Figure 4:
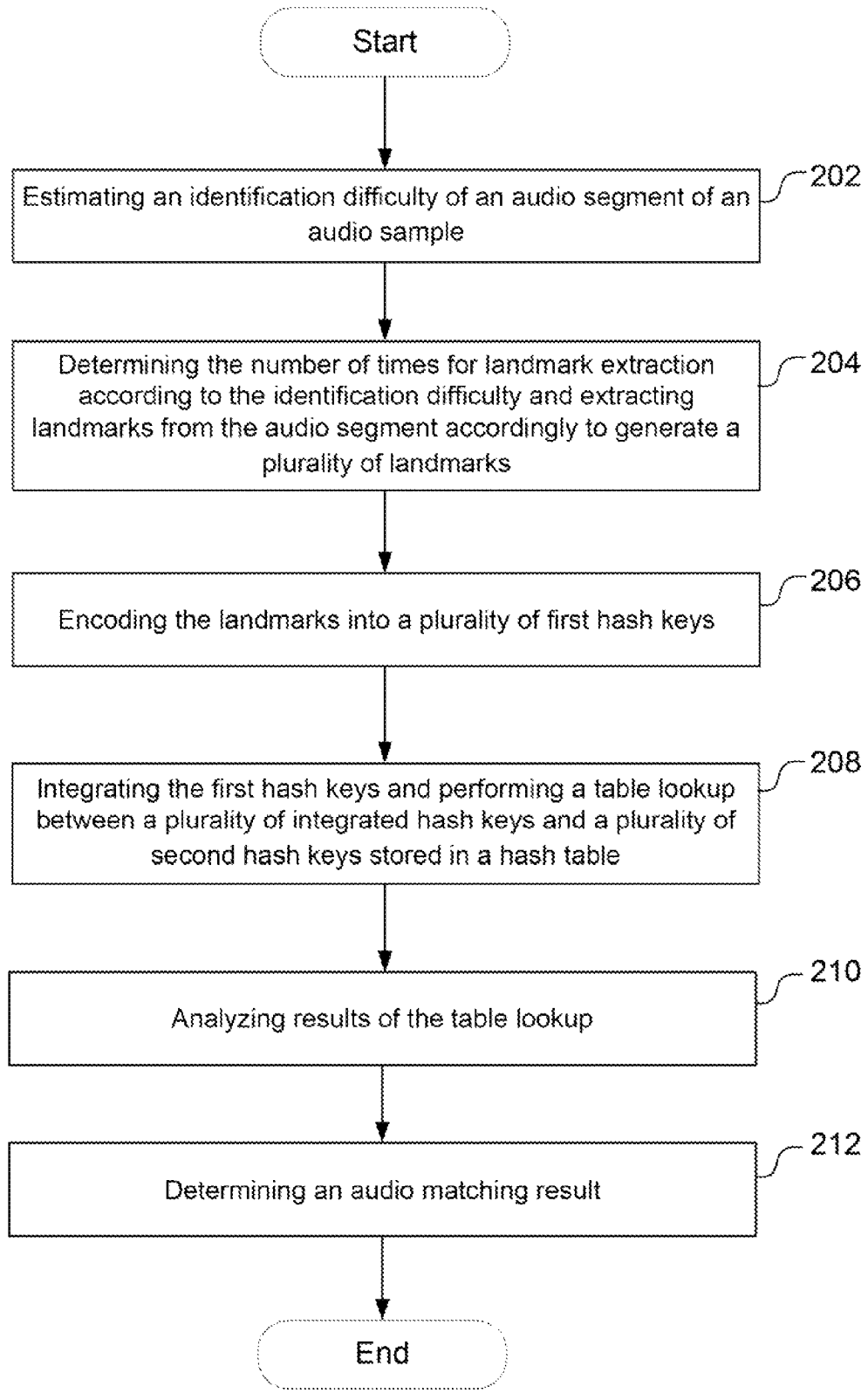
FIG. 4 is a flow chart of an audio matching method in accordance with one embodiment of the present disclosure.

Please refer to FIG. 4. FIG. 4 is a flow chart of an audio matching method in accordance with one embodiment of the present disclosure. The audio matching method may take the form of a computer program product stored on a computer-readable storage medium having computer-readable instructions embodied in the medium. Any suitable storage medium (such as non-transitory medium) may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives. The audio matching method could be applied in the computer system 100 illustrated in FIG. 1 and is not limited herein. For convenience and clarity, the following description about the audio matching method is illustrated based on the computer system 100 illustrated in FIG. 1.

In step 202, the classifier 112 estimates an identification difficulty of the audio segment 104 of the audio sample 102. In step 204, the landmark extraction module 114 determines the number of times for landmark extraction according to the identification difficulty and extracting landmarks from the audio segment 104 accordingly to generate a plurality of landmarks. In step 206, the encoder module 116 encodes the landmarks into a plurality of hash keys. In step 208, the integration module 118 integrates the hash keys and transmits the integrated hash keys to the table-lookup module 128 of the server 120. The table-lookup module 128 performs a table lookup between the integrated hash keys and a plurality of hash keys stored in the hash table 126. In step 210, the analysis module 130 analyzes results of the table lookup. In step 212, the decision module 132 determines an audio matching result.

Figure 5:
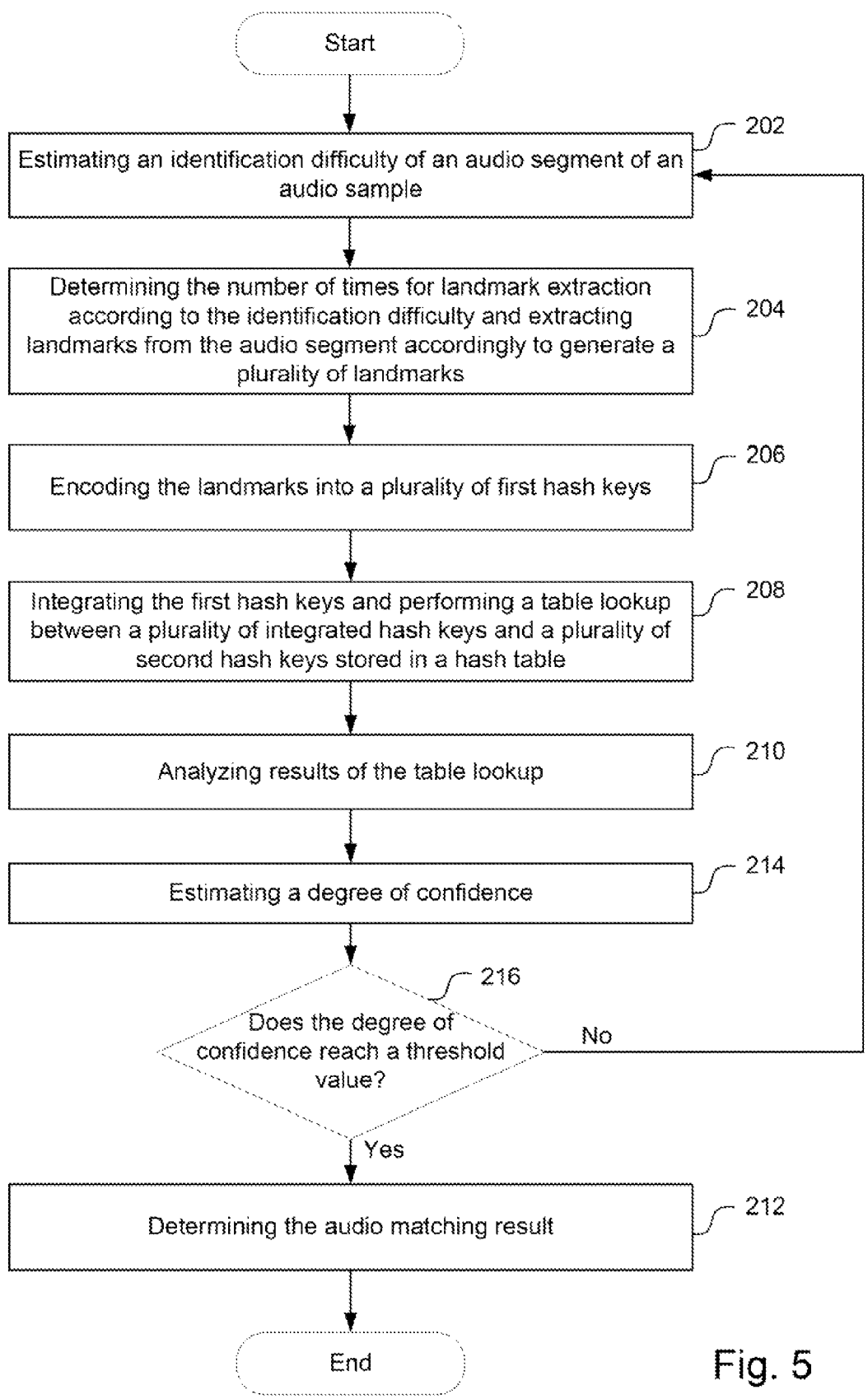
FIG. 5 is a flow chart of an audio matching method in accordance with one embodiment of the present disclosure.

Please refer to FIG. 5 FIG. 5 is a flow chart of an audio matching method in accordance with one embodiment of the present disclosure. The audio matching method could be applied in the computer system 100 illustrated in FIG. 1 and is not limited herein. For convenience and clarity, the following description about the audio matching method is illustrated based on the computer system 100 illustrated in FIG. 1.

Comparing with the audio matching method illustrated in FIG. 4, the audio matching method illustrated in FIG. 5 further includes steps 214 and 216. In step 214, the decision module 132 estimates a degree of confidence. In step 216, if the degree of confidence reaches a threshold value, the decision module 132 determines the audio matching result in step 212; if the degree of confidence does not reach the threshold value, the client terminal 110 inputs an audio segment of the audio sample 102 to the classifier 112, in which the audio segment succeeds to the audio segment 104. The abovementioned audio matching method is performed again on the inputted audio segment by the computer system 100.

From the abovementioned embodiments, by applying the present audio matching method, the deviation between the sampled audio frames of the audio segment 104 and of the audio sample 106 could be reduced by shifting the sampled audio frames of the audio segment 104 according to its audio characteristics and extracting the landmarks accordingly. As a result, the accuracy of audio matching is improved due to the reduction of the deviation between the sampled audio frames of the audio segment 104 and of the audio sample 106. Moreover, the client terminal 110 could upload the data of audio segments sequentially to the server 120 for identification, and the server 120 transmits the audio matching result back to the client terminal 110 right after the degree of confidence reaches a threshold value. In this way, the waiting time required for audio matching and the computation load of the server 120 could be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A computer system configured for performing audio matching, the computer system comprising a client terminal and a server, and the client terminal comprising:
    a classifier configured for estimating an identification difficulty of a first audio segment of a first audio sample;
    a first landmark extraction module configured for determining the number of times for landmark extraction according to the identification difficulty, and for extracting landmarks from the first audio segment accordingly to generate a plurality of first landmarks;
    a first encoder module configured for encoding the first landmarks into a plurality of first hash keys; and
    an integration module configured for integrating the first hash keys and for generating and transmitting a plurality of integrated hash keys to the server; and
    the server comprising:
    a second landmark extraction module configured for extracting landmarks from a plurality of second audio samples respectively to generate a plurality of second landmarks;
    a second encoder module configured for encoding the second landmarks into a plurality of second hash keys;
    a hash table configured for storing the second hash keys and a plurality of hash values corresponding to the second hash keys;
    a table-lookup module configured for performing a table lookup between the hash keys transmitted from the client terminal and the second hash keys stored in the hash table;
    an analysis module configured for analyzing results of the table lookup; and
    a decision module configured for determining an audio matching result and for transmitting the audio matching result to the client terminal.

2. The computer system of claim 1, wherein the decision module is further configured for estimating a degree of confidence, wherein when the degree of confidence reaches a threshold value, the decision module determines the audio matching result and transmits the audio matching result to the client terminal; and
    when the degree of confidence does not reach the threshold value, the decision module sends a request to the client terminal and the client terminal performs audio processing on a second audio segment of the first audio sample according to the request.

3. The computer system of claim 2, wherein the second audio segment succeeds to the first audio segment.

4. The computer system of claim 2, wherein the degree of confidence is the average number of hash keys of the first audio segment matched in one second.

5. The computer system of claim 1, wherein each one of the first landmarks and the second landmarks comprises a starting frequency, a frequency difference and a time difference.

6. The computer system of claim 1, wherein the hash value of each of the second hash keys comprises a landmark starting time and a program data.

7. The computer system of claim 1, wherein the classifier estimates the identification difficulty according to the average value of the absolute volume of the first audio segment, the standard deviation of the relative volume of the first audio segment, the standard deviation of the sum of the absolute value of the third order differentiation of the first audio segment, or a combination of the abovementioned three statistic parameters.

8. The computer system of claim 1, wherein when any two of the first hash keys are equal to each other, the integration module is further configured for deleting one of the two first hash keys.

9. The computer system of claim 1, wherein the first audio sample is audio of a song, a movie, a TV program or a broadcast program.

10. The computer system of claim 1, wherein the client terminal is a smart phone, a tablet computer, a laptop, a smart watch, a smart glasses, a smart television or a digital television set-top-box.

11. An audio matching method comprising:
    estimating an identification difficulty of a first audio segment of an audio sample;
    determining the number of times for landmark extraction according to the identification difficulty and extracting landmarks from the first audio segment accordingly to generate a plurality of landmarks;
    encoding the landmarks into a plurality of first hash keys;
    integrating the first hash keys and performing a table lookup between a plurality of integrated hash keys and a plurality of second hash keys stored in a hash table;
    analyzing results of the table lookup; and
    determining an audio matching result.

12. The audio matching method of claim 11, further comprising:
    estimating a degree of confidence;
    when the degree of confidence reaches a threshold value, determines the audio matching result; and
    when the degree of confidence does not reach the threshold value, performs the audio matching method of claim 11 on a second audio segment of the audio sample.

13. The audio matching method of claim 12, wherein the second audio segment succeeds to the first audio segment.

14. The audio matching method of claim 12, wherein the degree of confidence is the average number of hash keys of the first audio segment matched in one second.

15. The audio matching method of claim 11, wherein each one of the landmarks comprises a starting frequency, a frequency difference and a time difference.

16. The audio matching method of claim 11, wherein the hash value of each of the second hash keys comprises a landmark starting time and a program data.

17. The audio matching method of claim 11, wherein the average value of the absolute volume of the first audio segment, the standard deviation of the relative volume of the first audio segment, the standard deviation of the sum of the absolute value of the third order differentiation of the first audio segment, or a combination of the abovementioned three statistic parameters are utilized for estimating the identification difficulty.

18. The audio matching method of claim 11, wherein integrating the first hash keys further comprises:
    when any two of the first hash keys being equal to each other, deleting one of the two first hash keys.

19. A non-transitory computer readable storage medium with a computer program to execute an audio matching method, wherein the audio matching method comprises:
- estimating an identification difficulty of a first audio segment of an audio sample;
- determining the number of times for landmark extraction according to the identification difficulty and extracting landmarks from the first audio segment accordingly to generate a plurality of landmarks;
- encoding the landmarks into a plurality of first hash keys;
- integrating the first hash keys and performing a table lookup between a plurality of integrated hash keys and a plurality of second hash keys stored in a hash table;
- analyzing results of the table lookup; and
- determining an audio matching result.

* * * * *